United States Patent
Koka et al.

(10) Patent No.: US 7,638,917 B2
(45) Date of Patent: Dec. 29, 2009

(54) ELECTRICAL ROTATING MACHINE

(75) Inventors: Hidetoshi Koka, Hitachi (JP); Hiroshi Kanazawa, Hitachiota (JP); Susumu Terumoto, Numazu (JP); Masanori Nakagawa, Susono (JP)

(73) Assignee: Kokusan Denki Co., Ltd., Shizuoka (JP)

( * ) Notice: Subject to any disclaimer, the term of this patent is extended or adjusted under 35 U.S.C. 154(b) by 106 days.

(21) Appl. No.: 12/037,972

(22) Filed: Feb. 27, 2008

(65) Prior Publication Data
US 2008/0211338 A1    Sep. 4, 2008

(30) Foreign Application Priority Data
Feb. 27, 2007    (JP)    ............... 2007-046449

(51) Int. Cl.
H02K 1/00    (2006.01)
(52) U.S. Cl. ................................... 310/198
(58) Field of Classification Search ............... 310/198, 310/179, 216, 156.01
See application file for complete search history.

(56) References Cited
U.S. PATENT DOCUMENTS
4,315,171 A * 2/1982 Schaeffer ............... 310/49.53
6,094,011 A * 7/2000 Notsu ...................... 315/78
6,949,864 B2 * 9/2005 Maslov et al. ........... 310/254.1
7,038,348 B2 * 5/2006 Takase et al. .......... 310/216.008

FOREIGN PATENT DOCUMENTS

| JP | 2000-253602 | 9/2000 |
|---|---|---|
| JP | 2005-33924 | 2/2005 |
| JP | 2005-261117 | 9/2005 |
| JP | 2007-259575 | 10/2007 |
| WO | WO 03/098781 A1 | 11/2003 |

* cited by examiner

Primary Examiner—Nguyen N Hanh
(74) Attorney, Agent, or Firm—Antonelli, Terry, Stout & Kraus, LLP.

(57) ABSTRACT

An electrical rotating machine with permanent magnets which is configured such that the ratio of the number of magnetic poles of permanent magnets 3 to the number of magnetic poles of coils 12 is at 10:9 or 8:9. The coils 12 are configured such that a middle coil U− and two adjacent coils U+, U+ on both sides thereof are in-phase connected to be in-phase coils for each phase, and there is satisfied the relationship that $T2>T1$ and $T2>T3$, where $T2$ is the turn number of the middle coil U−, and $T1$ and $T3$ are the turn numbers of the adjacent coils U+, U+.

4 Claims, 8 Drawing Sheets

DIRECT COUPLING SIDE

ANTI-DIRECT COUPLING SIDE

DIRECT COUPLING SIDE

ANTI-DIRECT COUPLING SIDE

MAGNETOMOTIVE FORCE DIRECTION

MAGNETIC FLUX DIRECTION

ELECTRICAL ROTATING MACHINE

CROSS REFERENCE TO RELATED APPLICATIONS

This application claims the foreign priority benefit under Title 35, United States Code, §119(a)-(d) of Japanese Patent Application No. 2007-046449, filed on Feb. 27, 2007 in the Japan Patent Office, the disclosure of which is herein incorporated by reference in its entirety.

BACKGROUND OF THE INVENTION

1. Field of the Invention

The present invention relates to an electrical rotating machine using permanent magnets and coils.

2. Description of the Related Art

Electrical rotating machines such as generators have a stator comprising a plurality of coils and a rotor comprising a plurality of permanent magnets and are configured such that rotational magnetic fields generated by the rotating permanent magnets crossing the coils, thereby generating electromotive force across the coils.

For example, in International Publication WO/03/098781 pamphlet discloses a magnet field rotation type of electrical rotating machine with permanent magnets in which the ratio of the pole number of its rotor core to the pole number of its stator core is at 10:9 or 8:9. This electrical rotating machine is configured such that three in-phase coils are arranged consecutively. The number of turns of coils is not specified in WO/03/098781 pamphlet. Further, in FIG. 6 of WO/03/098781 pamphlet discloses that magnetic poles are added so that each of adjacent magnetic poles of the stator is made to be opposite a permanent magnet of a different polarity at the same electrical angle, thereby increasing effective magnetic flux.

The technique illustrated in FIG. 6 of WO/03/098781 pamphlet, with allowing an electrical rotating machine to be similar in body size to conventional electrical rotating machines, can suppress the amount of generated electricity in the medium to high rotation speed range, thus decreasing coil temperature and also improve output in the low rotation speed range.

However, because each magnetic pole is arranged to be opposite a permanent magnet at the same electrical angle, mechanical angles between the magnetic poles of the stator are not equal, but of three in-phase magnetic poles consecutively arranged, the left and right magnetic poles are displaced closer to the middle one, and hence there is the problem that it is difficult to wind a coil around the middle magnetic pole.

On the other hand, if intervals between the magnetic poles of the stator are made equal, when the middle one of the in-phase magnetic poles coincides in position with a magnetic pole of the rotor opposite it, the two magnetic poles (adjacent coils) adjacent to the middle one deviate in position from magnetic poles of the rotor opposite them. Hence, linkage flux linking to the adjacent coils becomes less than linkage flux linking to the middle magnetic pole. Meanwhile, there is the problem that, because copper loss is proportionate to the turn numbers of the coils wound around the stator, the copper loss in the adjacent coils also increases due to the adjacent coils while linkage flux increases.

SUMMARY OF THE INVENTION

An aspect of the present invention provides an electrical rotating machine having equal intervals between coils can reduce copper loss with linkage flux at the same level.

An aspect of the present invention provides an electrical rotating machine comprising: first magnet poles; and second magnetic poles including coils, wherein a ratio of the number of first magnetic poles to the number of the second magnetic poles is at either 10:9 or 8:9, wherein the coils are divided into groups, each group being provided for each phase, each group comprising a middle coil and two adjacent coils on both sides thereof which are in phase with the middle coil, and wherein T2>T1 and T2>T3, where T2 is the number of turns in the middle coil, and T1 and T3 are the numbers of turns in the two adjacent coils, respectively.

Preferably, three in-phase coils are arranged consecutively. Further, in the electrical rotating machine with permanent magnets, when the axis of the middle coil coincides in position with the magnetic pole of a permanent magnet opposite it, the axes of the two coils adjacent to the middle coil may deviate in position by an electrical angle of 20° from the magnetic poles of permanent magnets opposite them. Hence, linkage flux linking to the adjacent coils may become less than linkage flux linking to the middle coil. Meanwhile, because copper loss is proportionate to the total turn number, increasing the turn number of the middle coil and decreasing the turn numbers of the adjacent coils can reduce the copper loss with total linkage flux being maintained or increased.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Embodiment

Will be described an electrical rotating machine according to an embodiment of the present invention with reference to FIG. 1.

Figure 1:
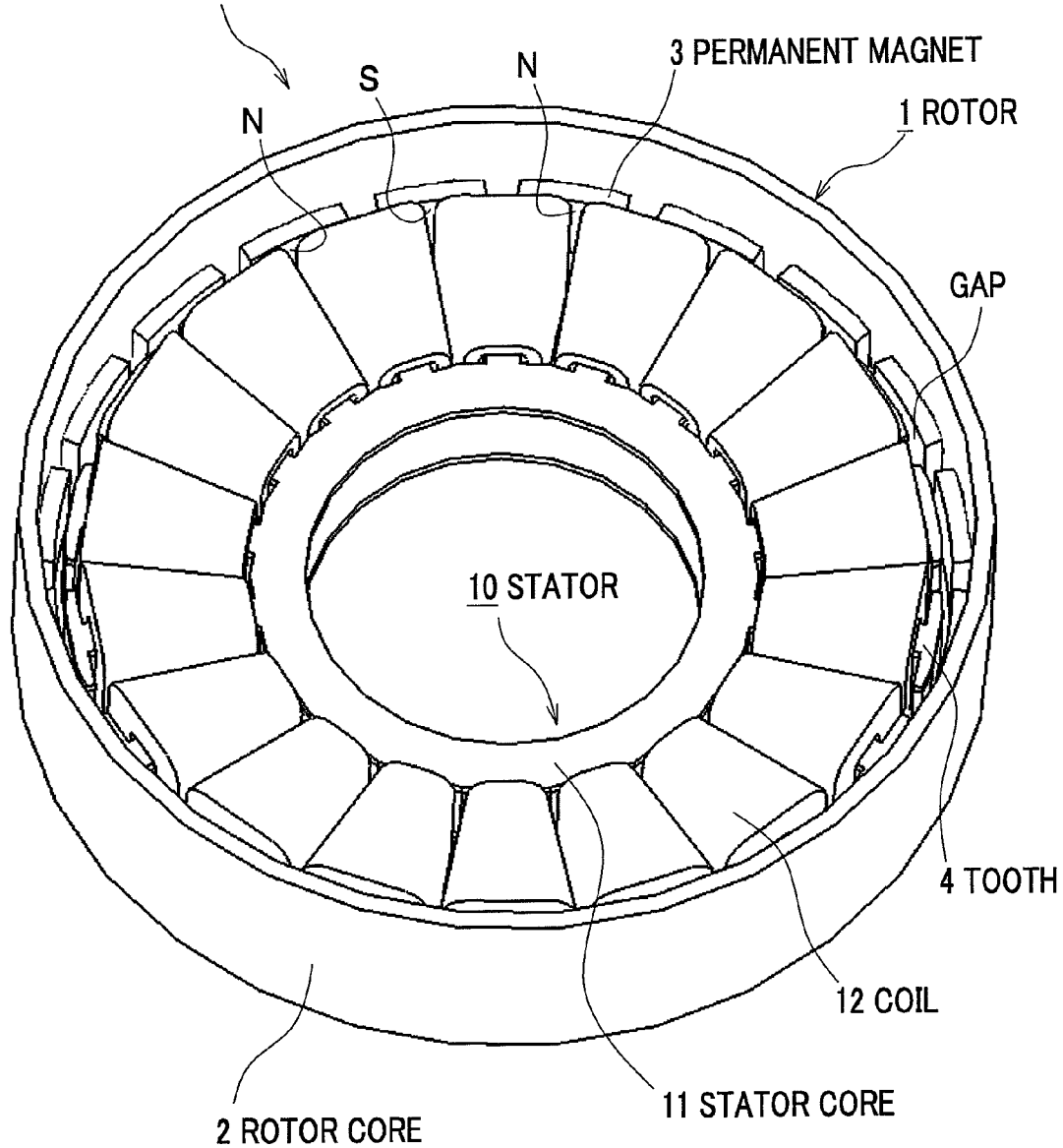
FIG. 1 is a perspective view of an electrical rotating machine according to an embodiment of the present invention.

In FIG. 1, an electrical rotating machine 100 is of an outer rotor type with permanent magnets and comprises a rotor 1 having multiple permanent magnets 3 fixed to the inner surface of a rotor core 2 and a stator 10 having multiple coils 12 wound through slots formed in a stator core 11 and has iron plates different in thickness (not shown) disposed at the opposite sides in its axis direction. The stator 10 is inserted in the rotor 1 with a slight gap between the stator 10 and the inner surface of the rotor 1, and the rotor 1 is rotatably supported by a bearing (not shown) to function as a fly wheel as well.

In the rotor 1, twenty plate-shaped permanent magnets 3 are arranged on the inner surface of the rotor core 2 at equal intervals in a circumferential direction such that N-poles alternate with S-poles. The rotor core 2 is in the shape of a shallow sleeve having a height in the axis direction shorter than its radius. The stator 10 comprises the stator core 11 having a ring-shaped central portion and eighteen coils 12, which are wound around eighteen teeth 4 respectively in a concentrated manner. That is, the number of stator magnetic poles of the present embodiment is eighteen (nine pairs), and the number of slots is eighteen. The teeth 4 are each shaped like a T and protrude radially at equal angular intervals from the stator core 11. The rotor core 2 and the stator core 11 are formed by piling electromagnetic steel plates one on top of another so as to reduce eddy current loss, but these cores may be formed by a powder magnetic core.

Figure 2:
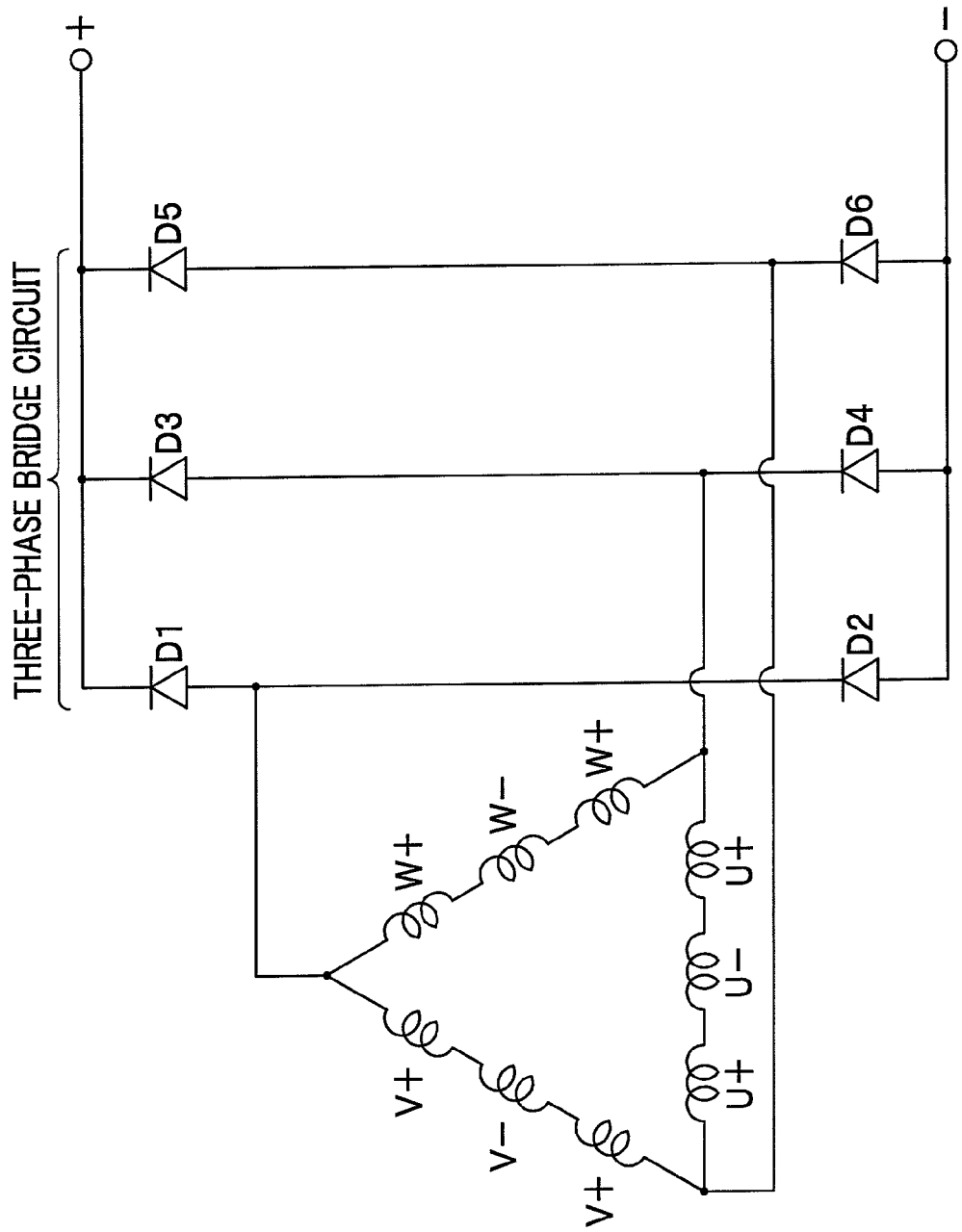
FIG. 2 is a schematic circuit diagram of the electrical rotating machine according to the embodiment of the present invention.

Next, the circuit configuration will be described using the schematic circuit diagram of FIG. 2. In the electrical rotating machine 100 of the present embodiment (FIG. 1), three in-phase coils U+, U−, and U+ are connected serially for each phase, and these sets of serially connected coils are connected in a Δ shape. With this configuration, by the rotor 1 rotating, rotational magnetic flux links to the coils 12, so that three-phase induced voltages having 120° phase differences are generated in twelve coils 12 connected in a three-phase arrangement. The three-phase induced voltages are converted into DC power by a three-phase bridge circuit comprising diodes D1 to D6.

Figure 3:
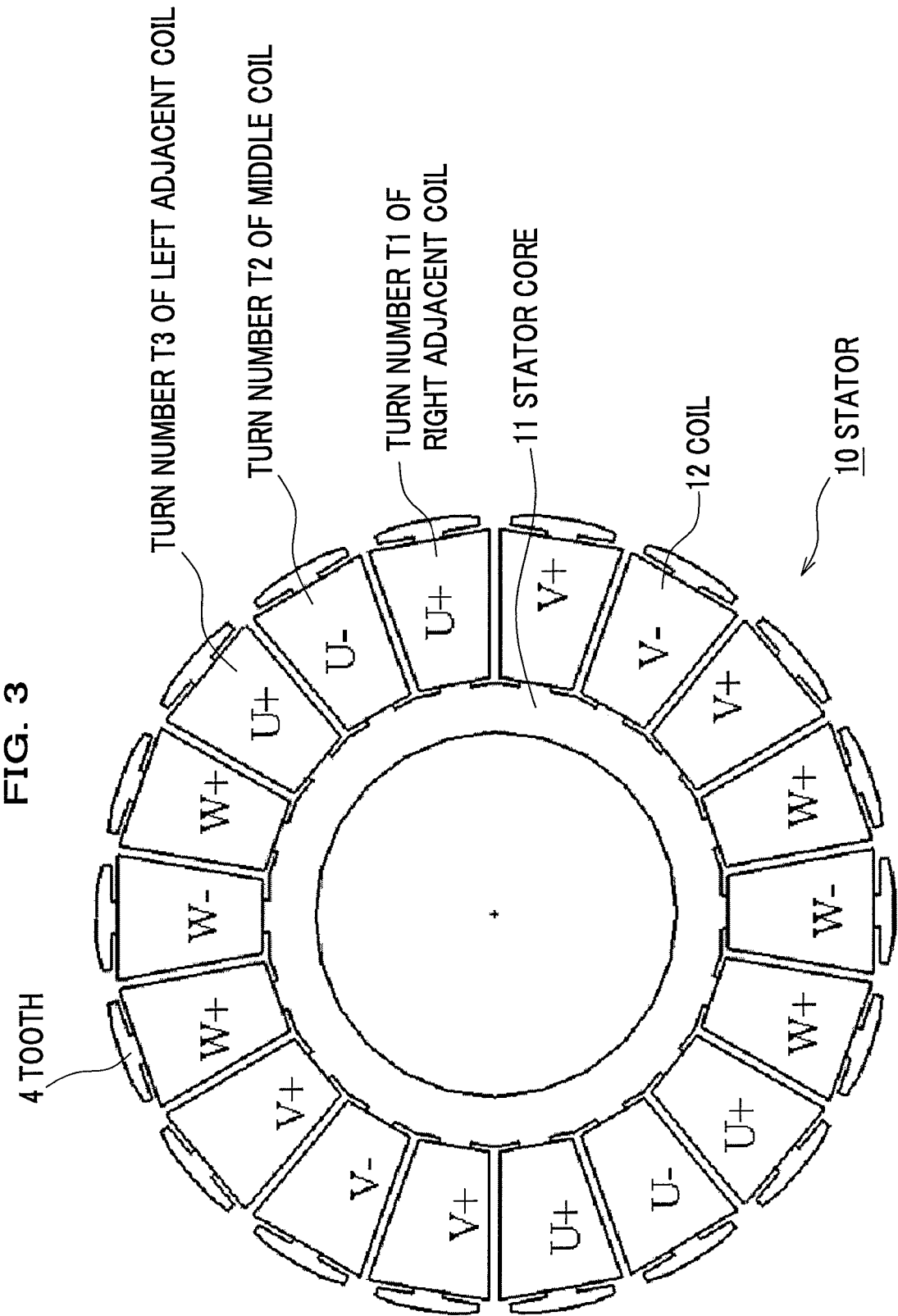
FIG. 3 is a plan view of a stator according to the embodiment.

Next, the configuration of the stator 10 will be described in detail. FIG. 3 shows the stator 10 of FIG. 1 as viewed from front, where the rotor 1 is assumed to rotate counterclockwise in the plane of FIG. 3. In FIG. 3, the coils 12 wound around the teeth 4 formed on the stator core 11 are configured such that three in-phase coils for each phase are arranged consecutively in the order of U+, U−, U+, W+, W−, W+, V+, V−, V+, U+, U−, U+, W+, W−, W+, V+, V−, and V+, counterclockwise in the plane. Here, U+ and U− indicate that the winding directions of their coils 12 are opposite. The middle coil U− of the three in-phase coils 12 is simply called a middle coil, and the turn number thereof is denoted as T2. The coils U+, U+ on both sides of the middle coil are called adjacent coils, and the turn number for them is denoted as T1 and T3.

Figure 4:
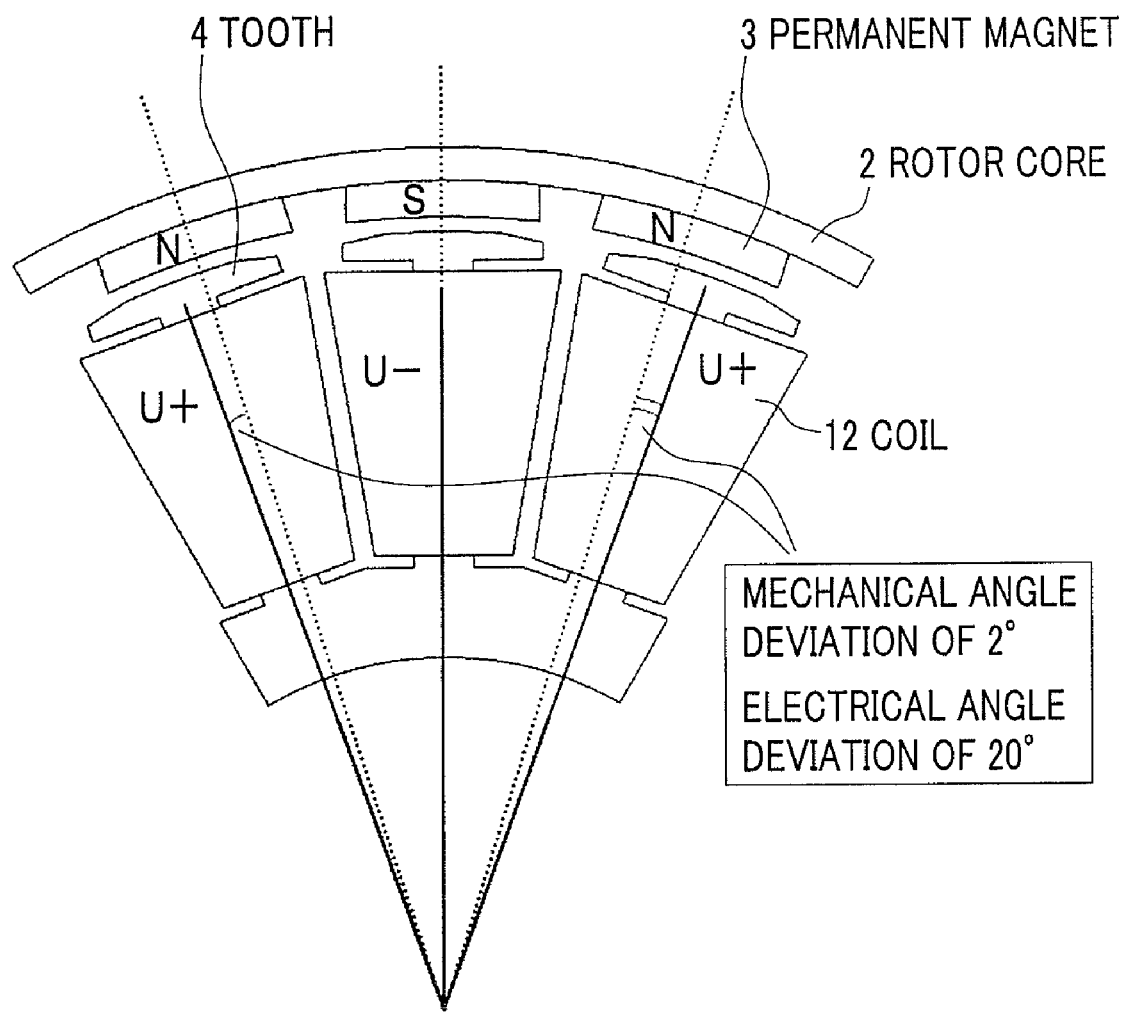
FIG. 4 illustrates an electrical angle deviation when the center line of a middle coil is coincide with that of the magnetic pole of a permanent magnet.

FIG. 4 shows a positional relationship between the three U-phase in-phase coils U+, U−, U+ and three permanent magnets 3 (N-pole, S-pole, N-pole), where the center lines of the middle coil U− and of the S-pole of a permanent magnet coincide. In this case, left and right adjacent coils U+, U+ deviate by an electrical angle of 20° (2° in mechanical angle). Because the magnetic pole number of the rotor 1 is twenty (ten pairs), an electrical angle equivalent to a mechanical angle of 360° is given by:

360°×(20/2)=3600°.

This electrical angle divided by the number of teeth (number of slots) of 18 makes:

3600°/18 =200°.

That is, where the teeth 4 are arranged evenly in a circumferential direction, the difference in electrical angle between adjacent teeth 4 is at 200°. If this difference were at 180°, a magnetic pole would coincide in phase with the U+ phase, but in reality, an electrical angle deviation of 20° (=180°−160°) occurs.

The induced voltage in the coil 12 is usually proportionate to linkage flux, i.e., the turn number, but because the left and right adjacent coils U+, U+ deviate by an electrical angle of 20° (2° in mechanical angle), their induced voltage becomes 0.940 (=cos 20°) times that of the U-phase middle coil U−. Therefore, the induced voltage generated by each of the left and right adjacent coils U+, U+, that is, the effective turn number of the coil equals its actual turn number multiplied by cos 20°. In other words, there are a place around which a coil is wound to act effectively and a place where a coil does not, depending on the location of the places.

Figure 5:
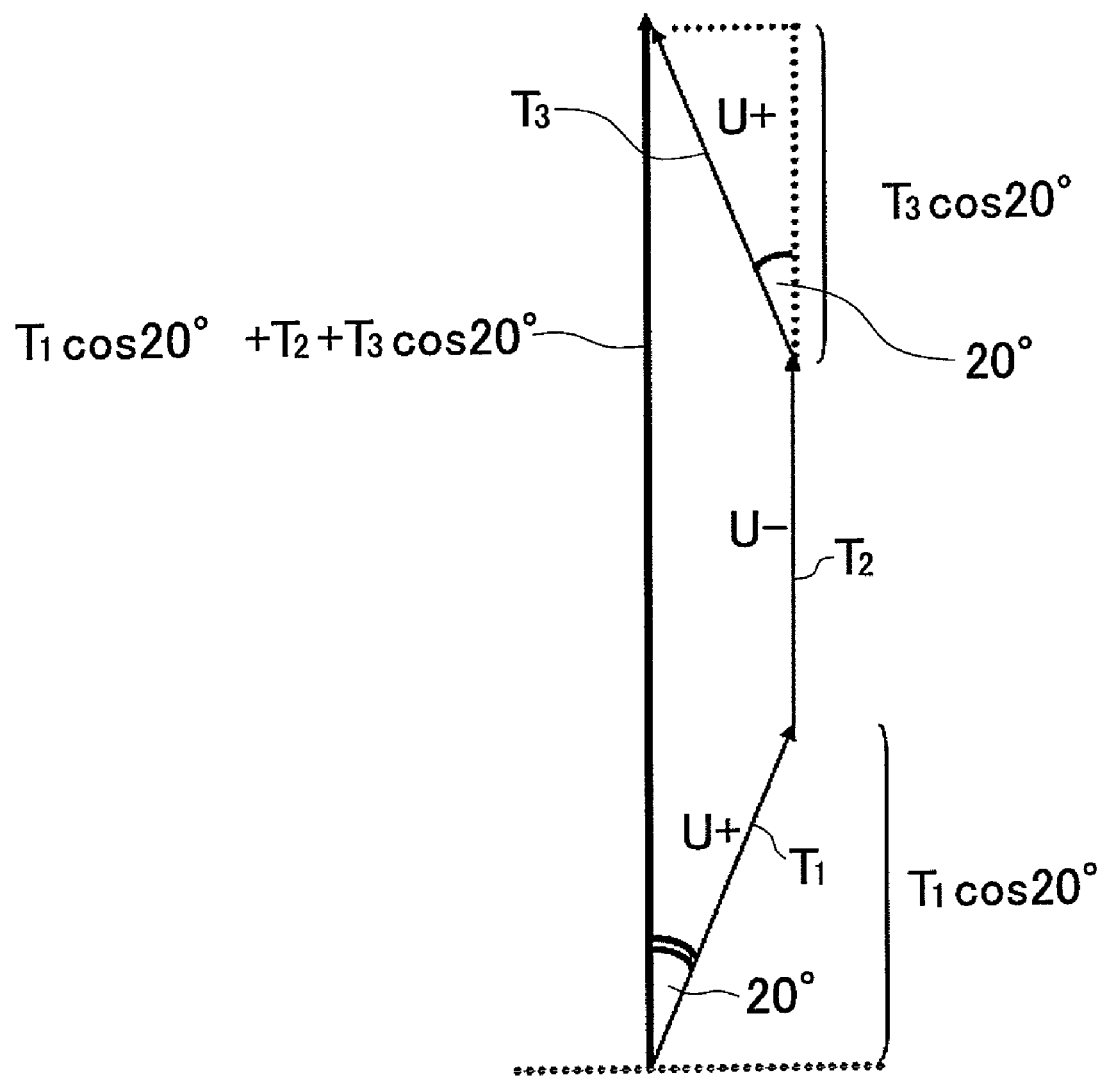
FIG. 5 illustrates a vector sum of the effective turn numbers of in-phase coils.

In FIG. 5, the effective turn numbers of the coils for the case of FIG. 4 are represented in the form of a vector diagram. Let T2 be the turn number of the middle coil U−, T1 be the turn number of the right adjacent coil U+, and T3 be the turn number of the left adjacent coil U+. While the turn number T2 of the middle coil U− has no electrical angle deviation, the effective turn number of the right and left adjacent coils U+, U+ equals T1 or T3 multiplied by cos 20° to become less than the actual one. Hence, the right and left adjacent coils U+, U+ are 6% lower in the rate of utilization than the middle coil U−. Thus, the total effective turn number of the three in-phase coils (adjacent coil U+, middle coil U−, adjacent coil U+) is expressed as T1·cos 20°+T2+T3·cos 20°.

In order to make the right and left adjacent coils U+, U+ have an induced voltage similar to that of the middle coil U−, the turn numbers T1, T3 of the right and left adjacent coils U+, U+ may be increased, but this results in elongating the wire rod of the coil, thus increasing copper loss. Hence, it is desirable to secure a high induced voltage with suppressing the turn number as much as possible. Accordingly, keeping the total turn number (T1+T2+T3) constant, the turn numbers T1, T3 of the right and left adjacent coils U+, U+, whose effective turn number is less than the actual one, are reduced, while the turn number T2 of the middle coil U−, whose effective turn number equals the actual one, is increased. By this means, the induced voltage can be increased without increasing copper loss.

Next, a specific turn number adjusting procedure will be described. Where the middle magnetic pole coincides with the magnetic pole center of a permanent magnet, let θ1 be the electrical angle deviation of the magnetic pole located on the right in the plane of FIG. 4, θ3 be the electrical angle deviation of the magnetic pole located on the left in the plane, T1 be the turn number of the right adjacent coil U+, T2 be the turn number of the middle coil U−, and T3 be the turn number of the left adjacent coil U+. In order to secure the same induced voltage, the turn number T2 of the middle coil U− may be increased so as to satisfy the equations (1) and (2):

$$T1 \cdot \cos \theta1 + T2 + T3 \cdot \cos \theta3 = \text{a constant} \tag{1}$$

$$T1 = T3 < T2 \tag{2}$$

Theoretically, as the turn number T2 of the middle coil U− increases, the induced voltage per turn increases. However, in view of mounting, the upper limit of the turn number T2 of the middle coil U− is determined by coil space and the winding technique.

The left and right magnetic poles may be displaced closer to the middle magnetic pole, and the turn number T2 of the middle coil U− may be increased. For example, if magnetic poles are placed at equal intervals, the electrical angle deviations θ1, θ3 equal 20° and the effective turn number of the right and left adjacent coils U+, U+ equals the actual turn number multiplied by cos 20° (=0.940). In contrast, by making the electrical angle deviations θ1, θ3 equal 10° (1° in mechanical angle), the effective turn number of the right and left adjacent coils U+, U+ becomes equal to the actual turn number multiplied by cos 10° (=0.985), which factor is closer to 1.000. Thus, because the effective turn number of the right and left adjacent coils U+, U+ becomes larger, the turn number T2 of the middle coil U− need not be so much large.

Figure 6:
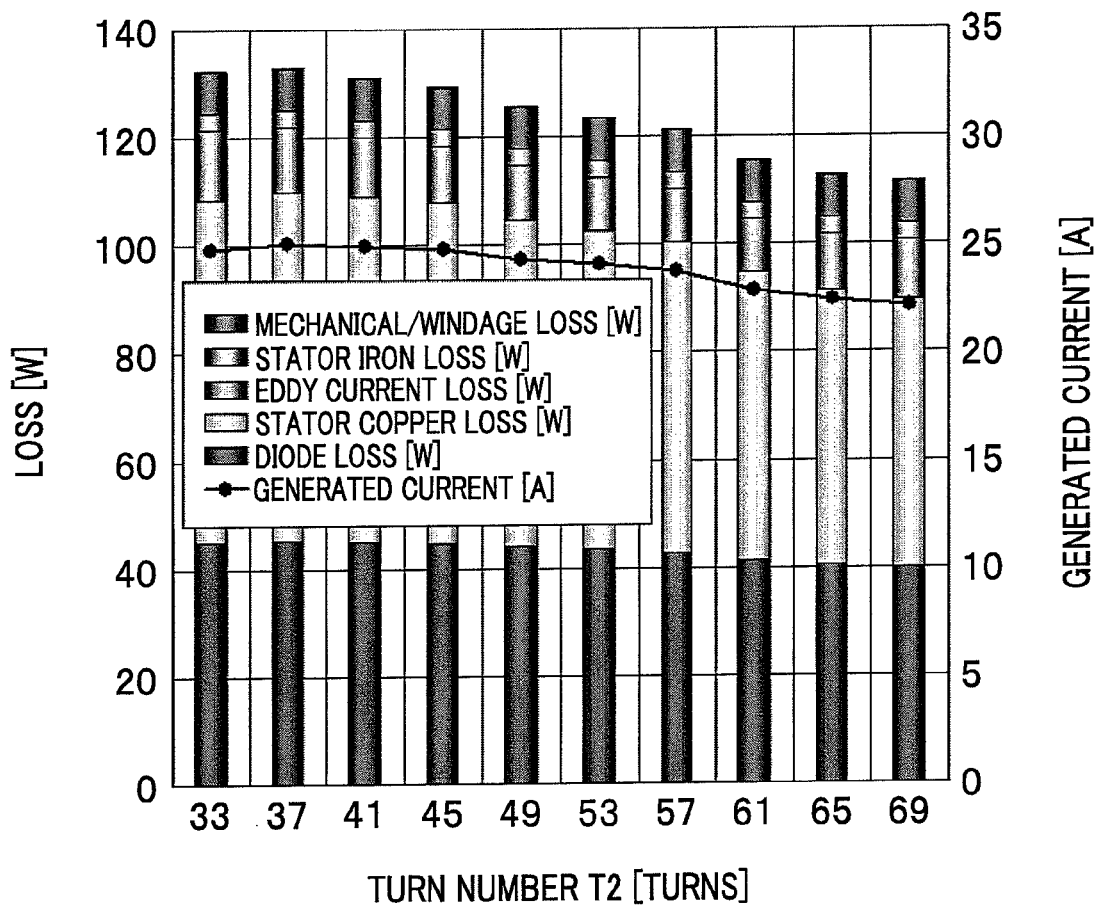
FIG. 6 is a characteristic graph of losses and a generated current during low speed rotation.

In the technique illustrated in FIG. 6 of WO/03/098781 pamphlet, since the electrical angle deviation θ=0°, the factor is at cos 0°=1.00, the turn number T2 of the middle coil U− need not be increased. However, because the coil spaces (slots) on both sides of the middle coil U− are narrower as mentioned previously, a sophisticated winding technique is needed to wind a coil through the narrow spaces.

The turn number is adjusted according to the same procedure for the V-phase and the W-phase as well as the U-phase.

As described above, in the magnet field rotation type of electrical rotating machine with permanent magnets that has the ratio of the number of magnetic poles of the rotor 1 to the number of magnetic poles of the stator 10 being at 10:9, the turn number T2 of the middle coil can be increased while the turn number T1 of the right coil and the turn number T3 of the left coil are decreased. By this means, securing a necessary induced voltage, the total turn number (T1+T2+T3) can be decreased, hence suppressing winding resistance. Thus, copper loss can be reduced.

In order to verify the effect of reducing copper loss, an analysis was conducted according to a two-dimensional finite element method.

FIG. 6 shows a characteristic chart of various losses and a generated current at 1,200 rpm (during low speed rotation). The horizontal axis represents the turn number T2 [turns] of the middle coil, and the vertical axes represent loss [W] and the generated current [A]. The various losses include mechanical/windage loss [W], stator iron loss [W], eddy current loss [W], stator copper loss [W], and diode loss [W] and are shown according to the ratios of them to the total loss.

Assuming that the rotor 1 rotates counterclockwise in the planes of FIGS. 3, 4, the turn number T1 of the adjacent coil U+ on the right in the plane of the figure and the turn number T3 of the adjacent coil U+ on the left were set so as to satisfy the equations (3) and (4). When the turn numbers of the three adjacent coils U+, U−, U+ are set to be the same, the turn number (=T1=T2=T3) is 41 [turns].

$$T1 \cdot \cos 20° + T2 + T3 \cdot \cos 20° = \text{a constant } (=41 \cdot \cos 20° + 41 + 41 \cdot \cos 20° = 118.1) \quad (3)$$

$$T1 = T3 \quad (4)$$

In this case, diode loss was about 43 [W], and stator copper loss was about 60 [W], which accounted for a large portion of a total loss of 131 [W]. Increase in the turn number T2 of the middle coil U− decreases the total loss from 131 W (at 41 turns) to 113 W (at 65 turns) by 13.7%, while the generated current decreased from 24.9 A (at 41 turns) to 22.4 A (at 65 turns) by a smaller amount of 10.0%.

Figure 7:
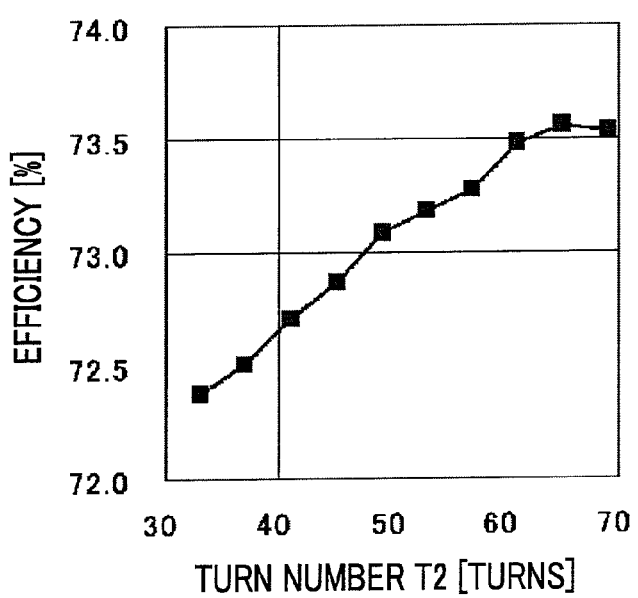
FIG. 7 is a characteristic chart of efficiency during low speed rotation.

FIG. 7 shows efficiency [%] at 1,200 rpm (during low speed rotation). It is seen from FIG. 7 that increase in the turn number T2 of the middle coil increases efficiency from 72.7% (at 41 turns) to 73.6% (at 65 turns). When the turn number T2=61 turns, the turn number T1=T3=30 turns, and when the turn number T2=65 turns, the turn number T1=T3=28 turns. In other words, maximum efficiency is obtained when the turn ratio T1:T2:T3 is at 1:2:1.

As described above, according to the present embodiment, the ratio of the number of magnetic poles of the permanent magnets 3 to the number of magnetic poles of the coils is at 10:9, and the middle coil U− and the adjacent coils U+, U+ in phase with the middle coil U− are arranged consecutively in a series of three. When the axis of the middle coil U− coincides in position with the magnetic pole of a permanent magnet 3 opposite the middle coil U−, the axes of the two coils U+, U+ adjacent to the middle coil U− deviate in position by an electrical angle of 20° from the magnetic poles of permanent magnets 3 opposite them. Hence, linkage flux linking to the adjacent coils U+, U+ equals linkage flux linking to the middle coil U−multiplied by cos 20°. Meanwhile, because copper loss is proportionate to the total turn number, by increasing the turn number T2 of the middle coil U− and decreasing the turn numbers T1, T3 of the adjacent coils U+, U+, copper loss can be reduced with total linkage flux for the in-phase coils being maintained. Further, keeping the total turn number (T1+T2+T3) constant, the linkage flux (i.e., induced voltage) can be increased without increasing copper loss. In particular, by making the turn numbers T1, T3 of the adjacent coils U+, U+ equal to the turn number T2 of the middle coil U− multiplied by cos 20°, linkage flux linking to the adjacent coils U+, U+ becomes equal to linkage flux linking to the middle coil U−.

[Modifications]

The invention is not limited to the above embodiment but can be modified in various ways, for example, as follows:

(1) Although in the above embodiment the ratio of the number of magnetic poles of the rotor 1 to the number of magnetic poles of the stator 10 is at 10:9, the ratio may be at 8:9. In this case, because the magnetic pole number of the rotor 10 is 16 (8 pairs), an electrical angle equivalent to a mechanical angle of 360° is given by:

$$360° \times (16/2) = 2880°.$$

This electrical angle divided by the number of teeth (number of slots) of 18 makes:

$$2880°/18 = 160°.$$

That is, where the teeth 4 are arranged evenly in a circumferential direction, the difference in electrical angle between adjacent teeth 4 is at 160°. If it is assumed that the electrical angle phase of the middle coil of the three in-phase coils 12 consecutively arranged is at 0° and of the U-phase, the electrical angle phases of the left and right adjacent coils are at ±160°. If this difference is at 180°, a magnetic pole coincides in phase with the U+ phase, but in reality, an electrical angle deviation of 20° occurs as in the case of the magnetic pole number ratio being at 10:9.

(2) Although in the above embodiment the electrical rotating machine 100 is used as a generator, the electrical rotating machine 100 can be used as a motor. In this case, applying three phase voltages to the coils 12 connected in a Δ shape generates a rotational magnetic field, so that the rotor 1 rotates. Further, although the above embodiment is of an outer rotor type where the stator 10 is inserted in the rotor 1, the electrical rotating machine may be of an inner rotor type where a rotor is inserted in a stator.

(3) Although in the above embodiment the stator 10 has 18 poles, the stator may have a number of poles equal to a multiple of 18 such as 36, 54, etc. Correspondingly, the number of poles of the rotor doubles, triples, etc., but the electrical angle deviation does not change from 20°. Note that although, as the number of poles increases, torque ripple becomes smaller, the frequency of magnetic flux increases, thus increasing iron loss.

Figure 8:
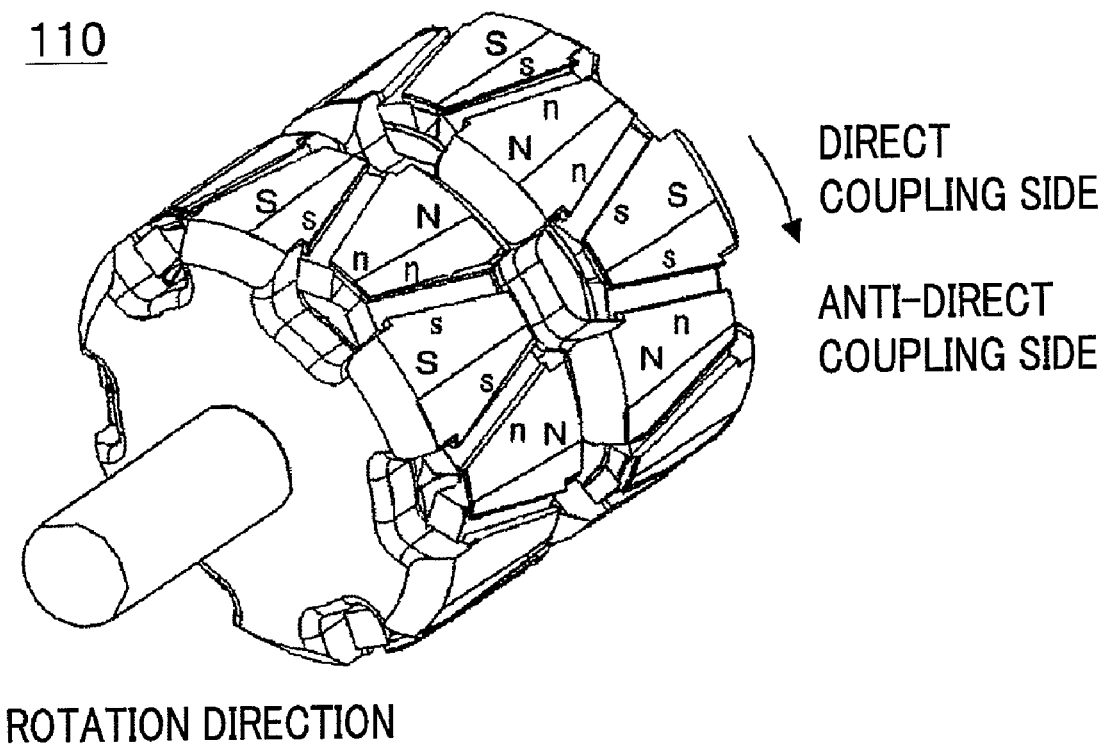
FIG. 8 is a perspective view of a modification of an electrical rotating machine according to the present invention.
Figure 9A:
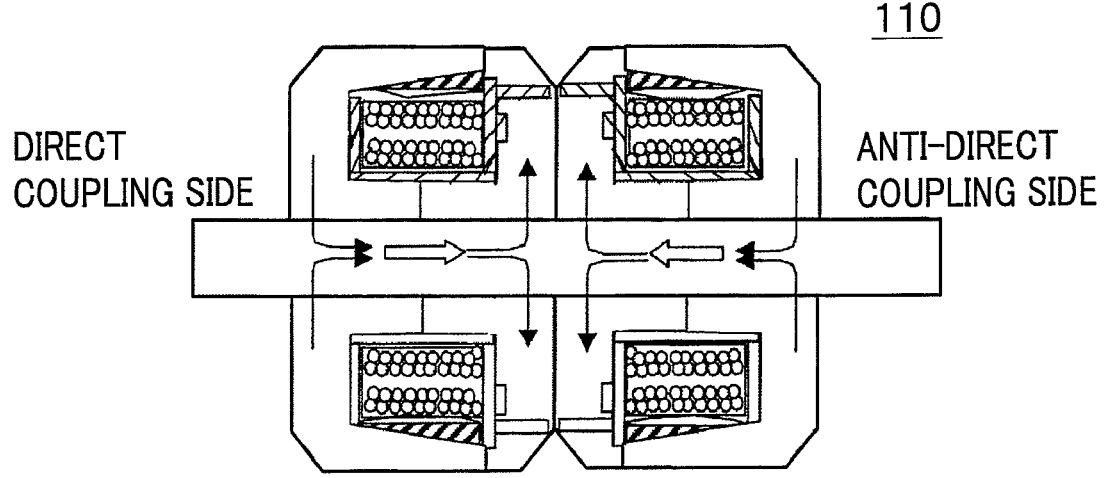
FIGS. 9A and 9B are sectional views of the modification shown in FIG. 8.
Figure 9B:
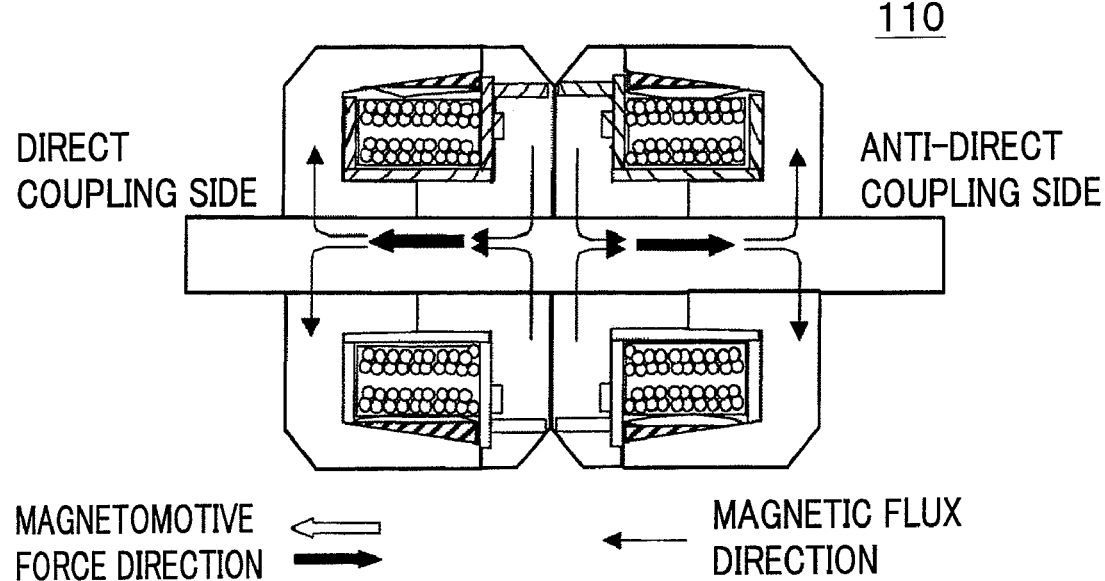

(4) Although in the above embodiment permanent magnets are used for the rotor so as to generate magnetic fields, windings may be used to generate magnetic fields. For example, in a tandem rotor 110 (an inner rotor) as shown in FIGS. 8, 9A and 9B, field currents are supplied to field windings via slip rings (not shown), and the field currents generate magnetic fields.

The invention claimed is:

1. An electrical rotating machine comprising:
   first magnet poles; and
   second magnetic poles including coils,
   wherein a ratio of the number of first magnetic poles to the number of the second magnetic poles is at either 10:9 or 8:9,
   wherein the coils are divided into groups, each group being provided for each phase, each group comprising a middle coil and two adjacent coils on both sides thereof which are in phase with the middle coil, and
   wherein T2>T1 and T2>T3, where T2 is the number of turns in the middle coil, and T1 and T3 are the numbers of turns in the two adjacent coils, respectively.

2. The electrical rotating machine according to claim 1, wherein T1 and T3 are substantially equal to T2 multiplied by a value of cos 20°.

3. The electrical rotating machine according to claim 1, wherein the second magnetic poles comprising a plurality of teeth, respectively, the electrical rotating machine further comprising a stator core for supporting the second magnetic poles and a rotor core, supporting the first magnetic poles, rotating coaxially with the stator, wherein the coils are wound around a plurality of the teeth, and the first magnetic poles are arranged circumferentially on the rotor core.

4. The electrical rotating machine according to claim 3, wherein the first magnet poles comprise permanent magnets.

* * * * *